June 6, 1967  J. J. BYLO  3,323,659
APPARATUS AND METHOD FOR CARRYING CARGO
Filed Sept. 7, 1965  3 Sheets-Sheet 1

INVENTOR.
John J. Bylo
BY Robert C. Comstock
Attorney

INVENTOR.
John J. Bylo
BY Robert C. Comstock
Attorney

United States Patent Office 3,323,659
Patented June 6, 1967

3,323,659
APPARATUS AND METHOD FOR CARRYING CARGO
John J. Bylo, 7272 Willoughby Ave., Los Angeles, Calif. 90046
Filed Sept. 7, 1965, Ser. No. 485,457
8 Claims. (Cl. 214—15)

This invention relates to an apparatus and method for loading, unloading and carrying cargo on ships or the like.

It is an object of my invention to provide a new and improved apparatus and method of the type described that provides greater versatility and flexibility in cargo loading and handling, which reduces labor costs and which is adaptable for unitized handling of cargo.

In essence, my invention contemplates a cargo handling unit which comprises an elongated yoke, a plurality of which are supported adjacent the upper portion of the hold of a ship. Suspended from opposite sides of the yoke are a pair of spaced parallel nets, which may be formed of metal cable, links, plates or the like, and which extend transversely across the hold of the ship.

Extended between the nets parallel to the elongated axis of the ship are a plurality of bars which are adapted to support cargo directly or to support pallets upon which cargo is mounted.

Each cargo handling unit is filled on the dock before being loaded on the ship. The cargo handling unit is then placed on the ship and its nets are secured to the hold of the ship and to the nets of the adjacent cargo handling units. The cargo handling units thus serve as the means for loading the cargo on the ship, as the means for holding the cargo while the ship is in transit, and as the means for unloading the cargo when the ship reaches its destination.

The net structures and their connections to the ship and to each other provides a spider web effect which prevents excessive movement of the cargo due to movements of the ship while at sea.

It is accordingly among the objects of my invention to provide an apparatus and method for carrying cargo having all of the advantages and benefits of the apparatus and method set forth above and described in further detail hereafter in this specification. My invention also contemplates such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Figure 1:
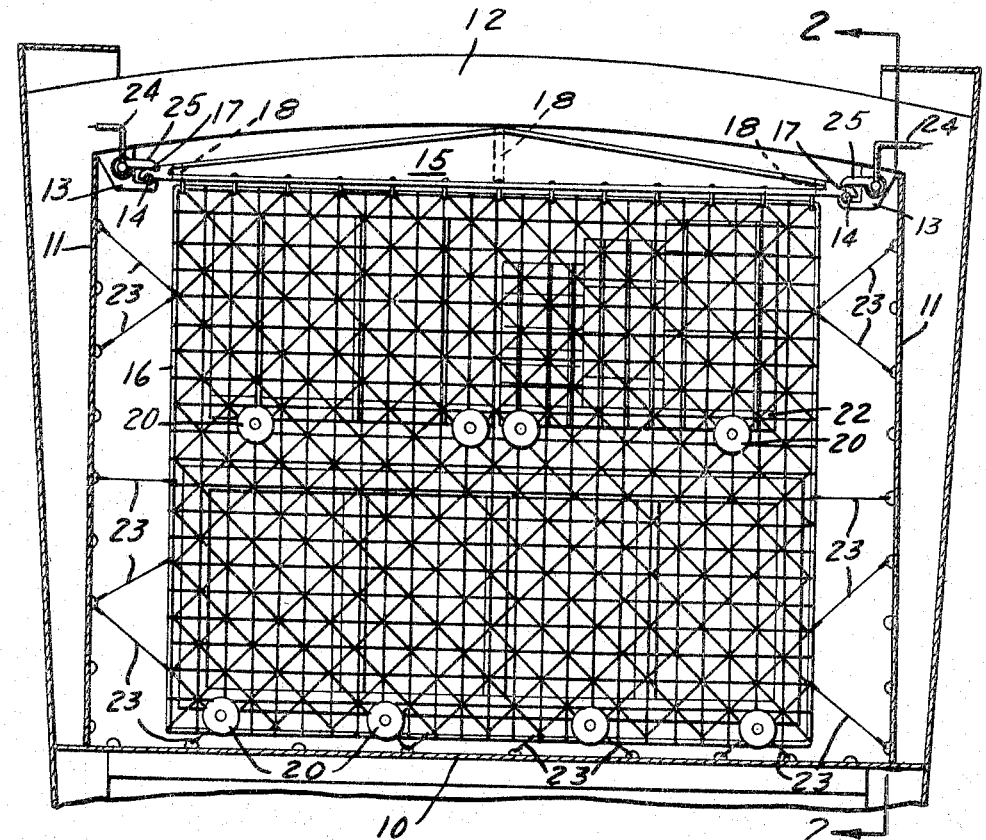
FIG. 1 is a transverse sectional view of my cargo carrying apparatus in use within the hold of a ship.
Figure 3:
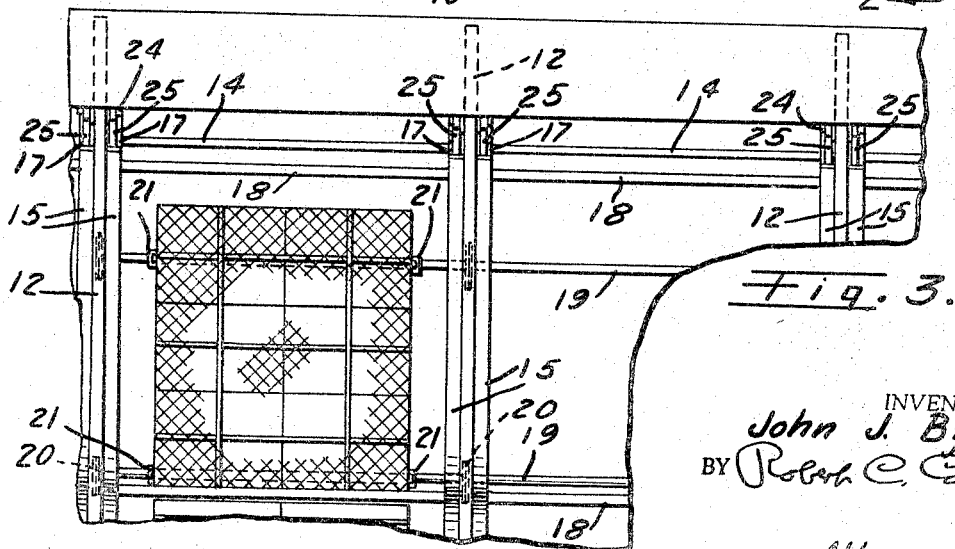
FIG. 3 is a partial top plan view of the same.

A preferred embodiment which has been selected to illustrate my invention is adapted to be used in a ship hold having a bottom deck 10, bulkheads 11 and a partially or completely open top. Extending across the top of the hold are a plurality of spaced transverse support members 12. Extending downwardly from the opposite sides of each of the support members 12 adjacent to the bulkheads 11 are a pair of arms 13, which support a pair of elongated support rods 14, which extend longitudinally for the length of the hold and which are adapted to support the cargo carrying members.

Each of the cargo carrying members comprises a pair of spaced yokes 15, which are connected at their midportions and ends by cross members 18. Each of the yokes 15 has at its opposite ends an accurate hook 17, which is adapted to fit over the rod 14.

Depending downwardly from each of the yokes 15 is a rectangular net 16, which may be formed of interwoven metal cables, links, plates or any other suitable material. In the embodiment shown in the drawings, the nets 16 are formed of metal cables which extend vertically, horizontally and diagonally in both diagonal directions. All of the strands of the nets 16 are preferably connected to each other at their intersections.

Extending transversely between the nets 16 are a plurality of movable bars 19, the opposite ends of which extend through openings in the net 16 and are supported at an intersection of the strands forming the nets 16. Each of the bars 19 has a disc 20 mounted on each end thereof.

Figure 2:
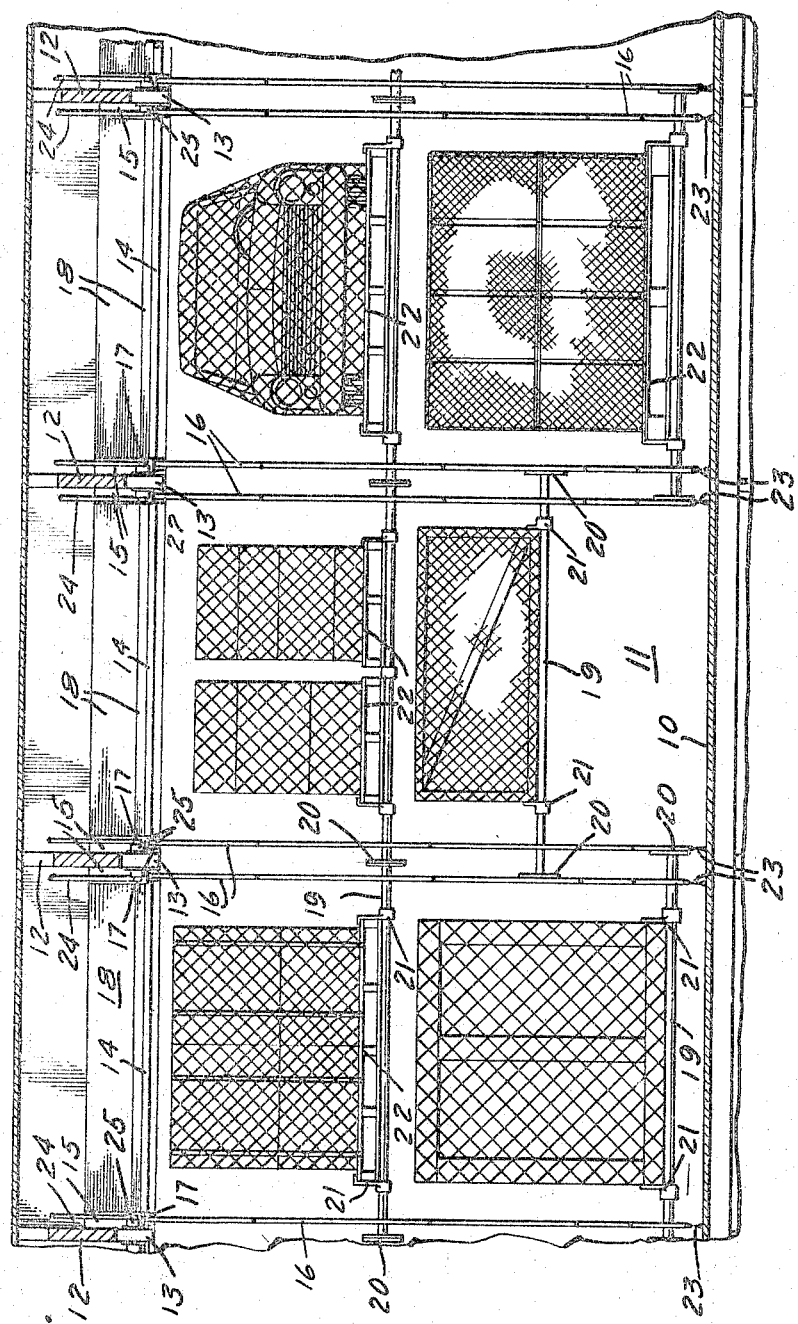
FIG. 2 is a partial longitudinal sectional view of the same, taken along line 2—2 of FIG. 1.
Figure 5:
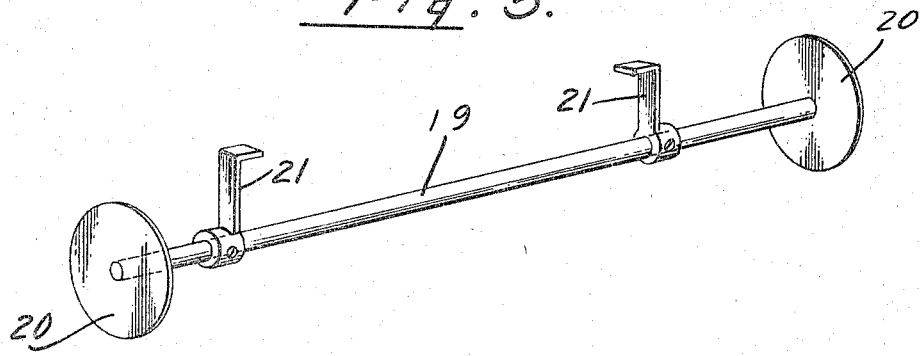
FIG. 5 is a perspective view of the bar, disc and holding means assembly.

Slidably mounted on each of the bars 19 is a pair of locking members 21, which are adapted to fit against and securely hold a pallet 22, or which may hold cargo directly without a pallet. The holding members 21 may be right angular, as shown in FIG. 5 and in some portions of FIG. 2, or they may be merely vertical, as shown in other portions of FIG. 2, depending upon the shape of the pallet or cargo which they are holding.

Each of the cargo carrying members is loaded with cargo on the dock or elsewhere before it is placed on the ship. This is done by using a plurality of bars 19, which support cargo directly or which support pallets 22 upon which the cargo is mounted. The cargo is customarily enclosed by nets which are secured to the pallets or otherwise securely held around the cargo in a conventional manner. The cargo carrying members accordingly act as a means for loading the cargo on the ship, for carrying the cargo in a secure manner within the hold of the ship while the ship is in transit and for unloading the cargo when the ship has reached its destination.

Each cargo carrying member is secured within the ship by means of a plurality of guys 23, which are connected by suitable means to the nets 16 and to the bulkheads 11 or deck 10 of the ship. The guys 23 may be connected to every intersection of strands along the edges of the nets 16, or to only some of them, particularly those strands and intersections which support the load carrying bars 19.

It is preferable that the guys 23 extend in a straight line as a virtual extension of the strands which support the load. In this way, the guys 23 effectively transfer part of the load supporting task to the structure of the ship itself, particularly when the ship is in motion.

The adjacent cargo carrying members should also be connected to each other. One means of providing such connection is by making the discs 20 at the ends of the bars 19 permanently magnetic, so that they are attracted to and hold each other or the strands of the adjacent cargo nets 16. The discs 20 may be made magnetic or they may carry suitable permanent magnetic material.

In the alternative, they may carry means for generating a magnetic field electrically, such as coils or the like. In such case, electric wires 24 are connected to locking bars 25 which engage the tops of the hooks 17 and lock them in place on the rods 14. Electricity is carried either through the strands forming the nets 16 or through other suitable wiring to the discs 20 for generating the magnetic fields.

It will be noted that the connection of the cargo carrying members to each other and to the hold of the ship provide a spider web effect, whereby the cargo is securely held against displacement due to movements of the ship while in transit.

Figure 4:
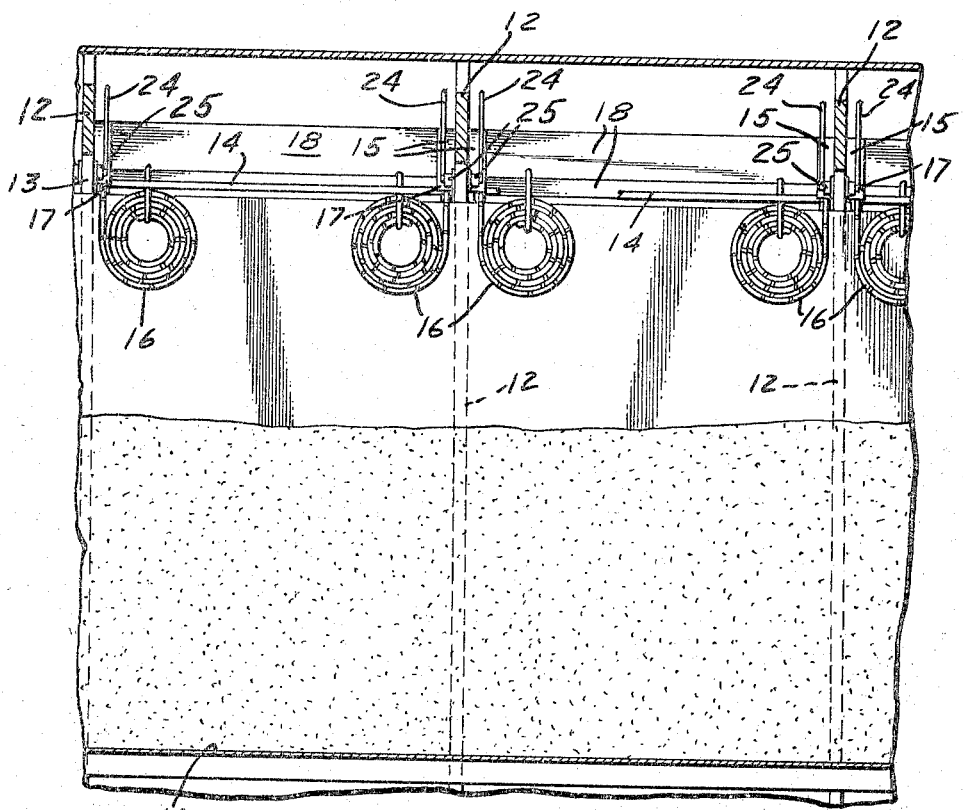
FIG. 4 is a view similar to FIG. 2, showing the cargo carrying apparatus out of use in stored position at the top of the hold, with the bottom of the hold being used for bulk cargo.

When the cargo carrying members are not in use, as on a return voyage, they can be left in the hold of the ship, with the nets rolled up and held against the yokes, as shown in FIG. 4 of the drawings leaving the hold free for bulk cargo or for other cargo carrying use.

The cargo carrying members might also be carried on the upper decks of the ship, above the hold, either rolled up or suspended from suitable temporary or permanent supports.

I claim:

1. An apparatus for loading, carrying and unloading cargo on a vessel, said apparatus comprising a plurality of cargo carrying members, each of said members having a pair of spaced yokes connected to each other, a rectangular net depending downwardly from each of said yokes, said net being formed of a plurality of strands of metal cable or the like extending vertically, horizontally and diagonally in both directions, all of said strands being connected to each other at their intersections, a plurality of bars removably extending transversely between said nets and adapted to support cargo within said nets, a disc carried by each end of each of said bars, said cargo carrying members adapted to be loaded with cargo and moved to and from and held within the hold of a ship as a unit, means for removably mounting said cargo carrying members in adjacent relationship to each other within the hold of a ship, said hold including a pair of spaced bulkheads, a bottom deck and a plurality of transversely directed support members, said mounting means comprising a pair of elongated rods connected to said support members, said rods extending longitudinally along the hold of the ship adjacent to said bulkheads, means carried by the opposite ends of said yokes for mounting said yokes on said rods, a plurality of guys extending between both sides of said nets and the adjacent bulkheads of said hold and between the bottoms of said nets and the bottom deck of said hold, and magnetic means carried by each of said discs for magnetically engaging a disc or the net of an adjacent cargo carrying member, whereby each of said cargo carrying members is connected to each of the adjacent cargo carrying members.

2. The structures described in claim 1, each of said guys extending in a straight line from one of the strands of said nets which directly supports one of said bars.

3. An apparatus for loading, carrying and unloading cargo on a vessel, said apparatus comprising a plurality of cargo carrying members, each of said members having a pair of spaced yokes connected to each other, a rectangular net depending downwardly from each of said yokes, said net being formed of a plurality of strands of metal cable or the like, a plurality of bars removably extending transversely between said nets and adapted to support cargo between said nets, each of said cargo carrying members adapted to be loaded with cargo and moved to and from and held within the hold of a ship as a unit, means for removably mounting said cargo carrying members in adjacent relationship to each other within the hold of a ship, said hold including a pair of spaced bulkheads and a bottom deck, a plurality of guys extending between both sides of said nets and the adjacent bulkhead of said hold and between the bottoms of said nets and the bottom deck of said hold, and means connecting the nets of each of said cargo carrying members to the nets of the adjacent cargo carrying members on both sides thereof.

4. An apparatus for loading, carrying and unloading cargo on a vessel, said apparatus comprising a plurality of cargo carrying members, each of said members having a pair of spaced yokes connected to each other, a net depending downwardly from each of said yokes, cargo supporting means extending between and supported by said nets, each of said cargo carrying members adapted to be loaded with cargo and moved to and from and held within the hold of a ship as a unit, means for removably mounting said cargo carrying members in adjacent relationship to each other within the hold of a ship, said hold including a pair of spaced bulkheads and a bottom deck, a plurality of guys extending between both sides of said nets and the adjacent bulkhead of said hold and between the bottoms of said nets and the bottom deck of said hold, and means connecting the nets of each of said cargo carrying members to the nets of the adjacent cargo carrying members on each side thereof.

5. The structure described in claim 4, and means for rolling said nets upwardly to a stored position adjacent to said yokes and maintaining said nets in said position within said hold to permit the use of the lower portion of said hold without removing said cargo carrying members from said hold.

6. A method of loading, carrying and unloading cargo on a vessel comprising loading said cargo on a plurality of cargo carrying members on a dock, each of said cargo carrying members having a pair of spaced yokes connected to each other and a rectangular net depending downwardly from each of said yokes, said cargo being carried by cargo supporting means removably extending transversely between and supported by said nets, moving each of said cargo carrying members as a unit into the hold of said vessel, disposing said cargo carrying members in side by side relationship within said hold, with said nets extending transversely to said hold, tying the sides and bottom of each of said nets to the bulkheads and deck of said hold, and connecting each of said nets to the net of the adjacent cargo carrying member, whereby said cargo is removably suspended within the hold of said vessel.

7. A method of loading, carrying and unloading cargo on a vessel comprising loading said cargo on a plurality of cargo carrying members, each of said members having a pair of spaced yokes connected to each other, a rectangular net depending downwardly from each of said yokes, mounting said cargo on a plurality of bars removably extending transversely between said nets and supported thereby, moving each of said cargo carrying members as a unit into the hold of said vessel, disposing said cargo carrying members in side by side relationship within said hold, with said nets extending transversely to said hold, tying both sides of each of said nets to the bulkheads of said hold, tying the bottoms of each of said nets to the bottom deck of said hold, and magnetically connecting each of said cargo carrying members to the adjacent cargo carrying member by magnetic means including a disc carried by each end of each of said bars, said disc carrying means for magnetically engaging a disc or the net of the adjacent cargo carrying member.

8. In an apparatus for loading, carrying and unloading cargo on a vessel, a plurality of cargo carrying members, each of said members having a pair of spaced yokes connected to each other, a metallic net depending downwardly from each of said yokes, cargo supporting means extending transversely between and supported by said nets, and magnetic means for connecting each of said nets to the adjacent net of the adjacent cargo carrying member.

References Cited

UNITED STATES PATENTS 1,936,826  11/1933  Butts et al. _____ 294—67
2,472,843  6/1949   Muise _____ 214—10.5 X GERALD M. FORLENZA, Primary Examiner.

R. G. SHERIDAN, Assistant Examiner.